United States Patent
Choi

(10) Patent No.: US 9,813,364 B2
(45) Date of Patent: Nov. 7, 2017

(54) IMAGE DISPLAY APPARATUS AND METHOD FOR OPERATING THE SAME

(71) Applicant: LG ELECTRONICS INC., Seoul (KR)

(72) Inventor: Kwonyul Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 281 days.

(21) Appl. No.: 14/109,443

(22) Filed: Dec. 17, 2013

(65) Prior Publication Data

US 2014/0181698 A1 Jun. 26, 2014

(30) Foreign Application Priority Data

Dec. 20, 2012 (KR) .......................... 10-2012-0149316

(51) Int. Cl.
| | | |
|---|---|---|
| *H04M 1/725* | (2006.01) | |
| *H04L 12/58* | (2006.01) | |
| *G06F 21/35* | (2013.01) | |
| *H04W 4/20* | (2009.01) | |
| *H04W 4/02* | (2009.01) | |
| *H04W 4/14* | (2009.01) | |

(52) U.S. Cl.
CPC ............ *H04L 51/046* (2013.01); *H04L 51/20* (2013.01); *G06F 21/35* (2013.01); *H04L 51/04* (2013.01); *H04L 51/10* (2013.01); *H04M 1/72544* (2013.01); *H04W 4/02* (2013.01); *H04W 4/025* (2013.01); *H04W 4/14* (2013.01); *H04W 4/206* (2013.01)

(58) Field of Classification Search
CPC .............. G06F 21/35; H04M 1/72544; H04M 1/72547; H04M 2250/22; H04W 4/02; H04W 4/025; H04W 4/14; H04W 4/206; H04L 51/04; H04L 51/10
See application file for complete search history.

(56) References Cited

U.S. PATENT DOCUMENTS

| | | | | |
|---|---|---|---|---|
| 2006/0227047 A1* | 10/2006 | Rosenberg | ............ | G01S 5/0054 342/357.55 |
| 2007/0078965 A1* | 4/2007 | Shimamura | ......... | H04L 12/5815 709/224 |
| 2007/0233635 A1* | 10/2007 | Burfeind | .............. | G06Q 10/109 |
| 2008/0133580 A1* | 6/2008 | Wanless | .............. | H04L 12/5815 |
| 2008/0182589 A1* | 7/2008 | Buccieri | ................. | H04W 4/02 455/456.3 |
| 2011/0035284 A1* | 2/2011 | Moshfeghi | ............. | G06Q 30/02 705/14.58 |
| 2011/0142016 A1* | 6/2011 | Chatterjee | .............. | G06Q 30/02 370/338 |

(Continued)

*Primary Examiner* — Shen Shiau
(74) *Attorney, Agent, or Firm* — Birch, Stewart, Kolasch & Birch, LLP

(57) ABSTRACT

An image display apparatus and a method for operating the same are disclosed. The image display apparatus includes a display configured to display a chat window and to display input conversation content in the chat window, a communication unit configured to receive direction information and distance information of one or more other users, and a controller configured to control display of an object indicating location information including at least one of direction information and distance information of the one or more other users in the chat window. Accordingly, it is possible to increase user convenience.

16 Claims, 22 Drawing Sheets

(56) References Cited

U.S. PATENT DOCUMENTS

| | | | | |
|---|---|---|---|---|
| 2012/0165035 A1* | 6/2012 | Chen | ................ | H04L 51/20 |
| | | | | 455/456.1 |
| 2012/0316963 A1* | 12/2012 | Moshfeghi | ............ | G06Q 20/20 |
| | | | | 705/14.58 |
| 2013/0038490 A1* | 2/2013 | Garcia | ................ | G01S 13/74 |
| | | | | 342/451 |
| 2013/0226453 A1* | 8/2013 | Trussel | ................ | H04L 51/20 |
| | | | | 701/533 |

\* cited by examiner

IMAGE DISPLAY APPARATUS AND METHOD FOR OPERATING THE SAME

CROSS-REFERENCE TO RELATED APPLICATION

This application claims the priority benefit of Korean Patent Application No. 10-2012-0149316, filed on Dec. 20, 2012 in the Korean Intellectual Property Office, the disclosure of which is incorporated herein by reference.

BACKGROUND OF THE INVENTION

1. Field of the Invention

The present invention relates to an image display apparatus and a method for operating the same and, more particularly, to an image display apparatus capable of increasing user convenience, and a method for operating the same.

2. Description of the Related Art

A mobile terminal which is an example of an image display apparatus is a portable device having at least one of a function for performing voice and video communication, a function for inputting and outputting information, and a function for storing data. Such a mobile terminal has complicated functions such as photographing of photos, capturing of moving images, playback of music files or moving image files, reception of games or broadcasts, or wireless Internet and has been implemented as a multimedia player, as the functions thereof have been diversified. New attempts have been variously given to the mobile terminal implemented as the multimedia player in hardware or software in order to implement complicated functions.

SUMMARY OF THE INVENTION

Therefore, the present invention has been made in view of the above problems, and it is an object of the present invention to provide an image display apparatus capable of increasing user convenience, and a method for operating the same.

In accordance with an aspect of the present invention, the above and other objects can be accomplished by the provision of an image display apparatus including a display configured to display a chat window and to display input conversation content in the chat window, a communication unit configured to receive direction information and distance information of one or more other users, and a controller configured to control display of an object indicating location information including at least one of direction information and distance information of the one or more other users in the chat window.

In accordance with another aspect of the present invention, there is provided a method for operating an image display apparatus including displaying a chat window, displaying input conversation content in the chat window, and displaying an object indicating location information including at least one of direction information and distance information of one or more other users in the chat window.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described in detail with reference to the attached drawings.

An image display apparatus described in the present specification includes a mobile terminal, a TV and a monitor. The mobile terminal may include a mobile phone, a smartphone, a laptop, a digital broadcast terminal, a personal digital assistant (PDA), a portable multimedia player (PMP), a camera, a navigation system, a tablet computer, an e-book terminal, etc.

The terms "module" and "unit" attached to describe the names of components are used herein to help the understanding of the components and thus they should not be considered as having specific meanings or roles. Accordingly, the terms "module" and "unit" may be used interchangeably.

Figure 1:
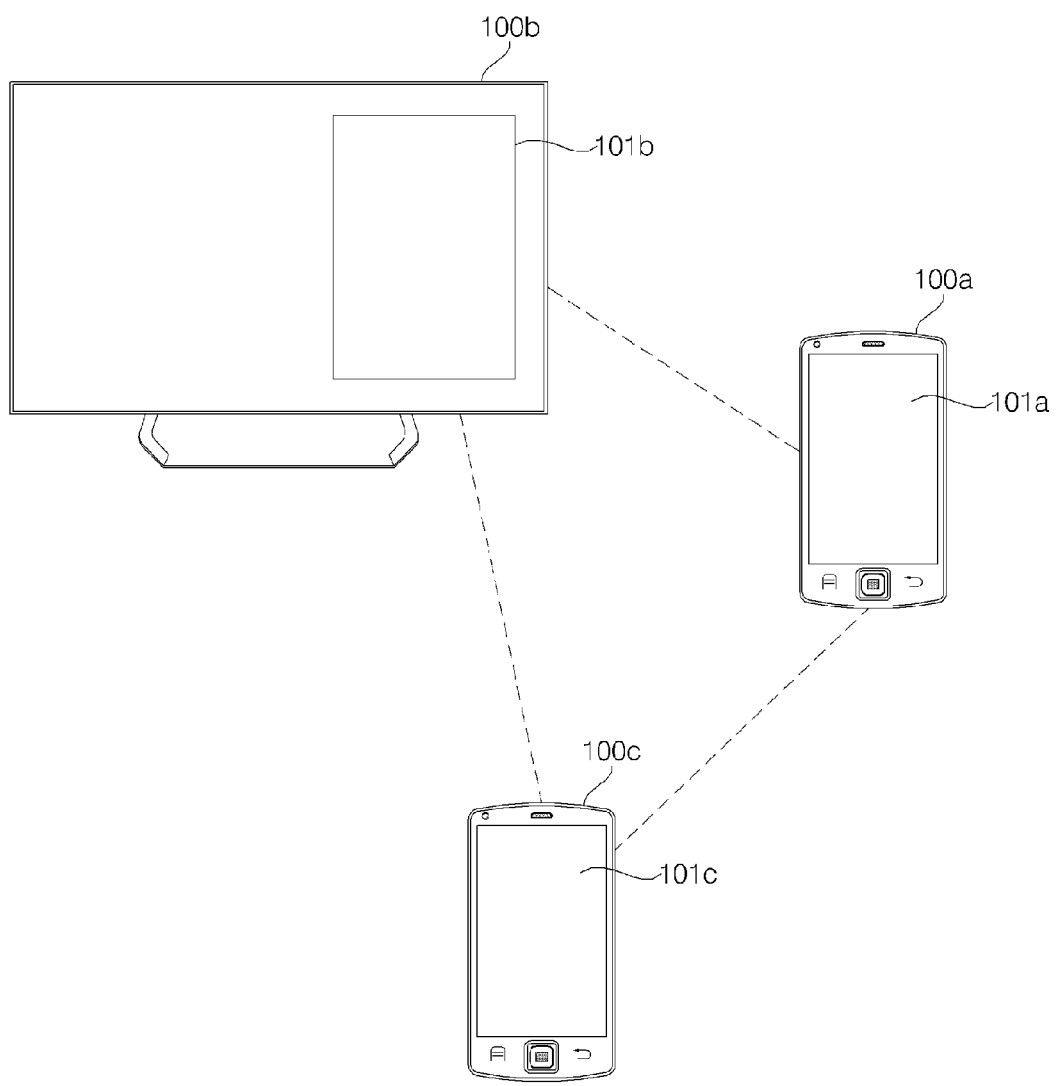
FIG. 1 is a diagram showing display of chat windows of a plurality of image display apparatuses.

FIG. 1 is a diagram showing display of chat windows of a plurality of image display apparatuses.

Referring to FIG. 1, a chat window may be displayed on each of the plurality of image display apparatuses and thus users may have a conversation via text input.

A first image display apparatus is a mobile terminal 100a, on which a chat window 101a is displayed, a second image display apparatus is a TV 100b or a monitor on which a chat window 101b is displayed, and a third image display apparatus is a mobile terminal 100c, on which a chat window 101c is displayed.

In the embodiment of the present invention, an object indicating location information including direction information and distance information of one or more other users is displayed in the chat window. Thus, it is possible to intuitively confirm the direction and distance direction of the other user. As a result, user convenience can be increased.

In particular, at least one of a size, a length, a line thickness and transparency of an object or a size, italicization and transparency of text displayed in the chat window may be changed according to the direction information or the distance information. Accordingly, it is possible to confirm the location information of the other users.

The object indicating the location information may be updated and displayed. Accordingly, it is possible to immediately confirm change in location information of the other users.

The display location of the object may be changed according to the location of each user. Accordingly, it is possible to confirm the location of the user.

Input for changing a reference location of location information may be received and the changed location information may be displayed according to the changed reference location. Accordingly, the user can confirm the locations of the other users according to desired reference location.

Figure 2:
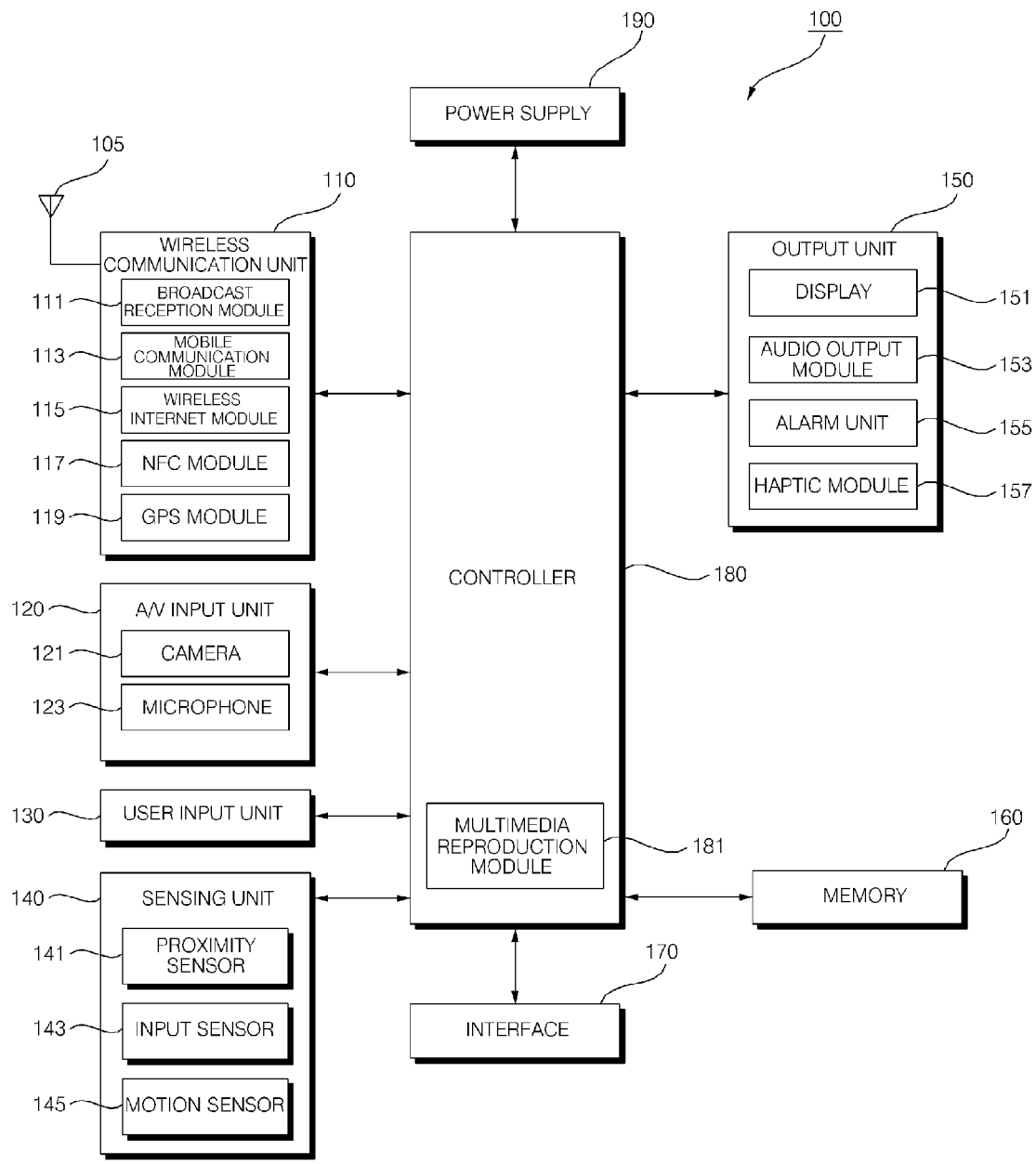
FIG. 2 is a block diagram showing the configuration of a mobile terminal which is an example of an image display apparatus according to an embodiment of the present invention.

FIG. 2 is a block diagram showing the configuration of a mobile terminal which is an example of an image display apparatus according to an embodiment of the present invention. The components of the mobile terminal according to the embodiment of the present invention will be described with reference to FIG. 2.

Referring to FIG. 2, the mobile terminal 100 may include a wireless communication system 110, an audio/video (A/V) input unit 120, a user input unit 130, a sensing unit 140, an output unit 150, a memory 160, an interface 170, a controller 180 and a power supply 190. Two or more components may be combined into one component or one component may be divided into two or more components, as necessary.

The wireless communication unit 110 may include a broadcast reception module 111, a mobile communication module 113, a wireless Internet module 115, a near field communication (NFC) module 117, a global positioning system (GPS) module 119, etc.

The broadcast reception module 111 receives at least one of a broadcast signal and broadcast-related information from an external broadcast management server through a broadcast channel. The broadcast channel may include a satellite channel and a terrestrial channel. The broadcast management server may refer to a server for generating and transmitting at least one of a broadcast signal and broadcast-related information or a server for receiving and transmitting at least one of a previously generated broadcast signal and broadcast-related information to a terminal.

The broadcast signal may include not only a TV broadcast signal, a radio broadcast signal and a data broadcast signal but also a broadcast signal obtained by combining a TV broadcast signal or a radio broadcast signal with a data broadcast signal. The broadcast-related information may refer to information related to a broadcast channel, a broadcast program or a broadcast service provider. The broadcast-related information may be provided via a mobile communication network and, in this case, may be received by the mobile communication module 113. The broadcast-related information may have various formats.

The broadcast reception module 111 receives a broadcast signal using various broadcast systems. More particularly, the broadcast reception module 111 may receive a digital broadcast signal using a digital broadcast system such as digital multimedia broadcasting-terrestrial (DMB-T), digital multimedia broadcasting-satellite (DMB-S), Media Forward Link Only (MediaFLO), digital video broadcast-handheld (DVB-H) or integrated services digital broadcast-terrestrial (ISDB-T). The broadcast reception module 111 may be configured to suit not only a digital broadcast system but also all broadcast systems for providing broadcast signals. The broadcast signal and/or the broadcasted-related information received through the broadcast reception module 111 may be stored in the memory 160.

The mobile communication module 113 transmits or receives a wireless signal to or from at least one of a base station, an external terminal and a server over a mobile communication network. The wireless signal may include a voice call signal, a video call signal or various types of data associated with transmission and reception of a text/multimedia message.

The wireless Internet module 115 is an internal or external module for wireless Internet access which may be provided to the mobile terminal 100. As wireless Internet technologies, Wireless LAN (WLAN) (Wi-Fi), Wireless broadband (WiBro), World Interoperability for Microwave Access (Wi-Max) or High Speed Downlink Packet Access (HSDPA), etc. may be used.

The NFC module 117 may perform NFC. As NFC technologies, Bluetooth, Radio Frequency Identification (RFID), Infrared Data Association (IrDA), Ultra Wideband (UWB), ZigBee, etc. may be used.

The GPS module 119 may receive position information from a plurality of GPS satellites.

The A/V input unit 120 receives an audio signal or a video signal and may include a camera 121 and a microphone 123. The camera 121 processes a video frame of a still image or a moving image obtained by an image sensor in a video call mode or a photographing mode. The processed video frame may be displayed on the display 151.

The video frame processed by the camera 121 may be stored in the memory 160 or externally transmitted through the wireless communication unit 110. The number of cameras 121 may be two or more according to the configuration of the terminal.

The microphone 123 receives an external audio signal in a call mode, a recording mode or a voice recognition mode and converts the external audio signal into electrical audio data. The processed audio data may be converted into a format transmittable to a mobile communication base station through the mobile communication module 113 to be output in a call mode. The microphone 123 may use various noise elimination algorithms for eliminating noise generated in a process of receiving the external audio signal.

The user input unit 130 generates key input data enabling the user to control the operation of the terminal. The user input unit 130 may include a keypad, a dome switch, a touchpad (static pressure/static electrical), etc., which are capable of receiving a command or information by a push or touch operation of the user. The user input unit 130 may include a jog wheel for rotating a key, a joystick, a finger mouse, etc. In particular, if the touchpad and the display 151 have a layered structure, it may be called a touchscreen.

The sensing unit 140 detects a current state of the mobile terminal 100 such as whether the mobile terminal 100 is opened or closed, the position of the mobile terminal 100 and contact/non-contact of a user and generates a sensing signal for controlling the operation of the mobile terminal 100. For example, if the mobile terminal 100 is a slide phone, the sensing unit 140 may sense whether the slide phone is opened or closed. The sensing unit 140 may sense whether or not the power supply 190 supplies power or whether or not an external device is connected through the interface 170.

The sensing unit 140 may include a proximity sensor 141, a pressure sensor 143 and a motion sensor 145. The proximity sensor 141 detects presence/absence of an object which approaches the mobile terminal 100 or an object located in the vicinity of the mobile terminal 100 without mechanical contact. The proximity sensor 141 may detect an object approaching the mobile terminal using a change in an AC magnetic field, a change in a static magnetic field or a rate of change in capacitance. In addition, the proximity sensor may detect which surface of the mobile terminal is gripped by a user. The number of proximity sensors 141 may be two or more according to the configuration of the terminal.

The pressure sensor 143 may detect whether pressure is applied to the mobile terminal 100 or the level of the pressure. The pressure sensor 143 may be mounted at a position where pressure applied to the mobile terminal 100 needs to be detected according to a use environment. If the pressure sensor 143 is mounted in the display 151, touch input through the display 151 and pressure touch input having pressure greater than that of the touch input may be identified according to the signal output from the pressure sensor 143. The level of the pressure applied to the display 151 may be detected according to the signal output from the pressure sensor 143 upon pressure touch input.

The motion sensor 145 may sense motion or position of the mobile terminal 100 using an acceleration sensor, a gyroscopic sensor, etc. In particular, as the acceleration sensor which may be used in the motion sensor 145, a sensor for converting an acceleration change in one direction into an electrical signal has been widely used with development of a micro-electromechanical system (MEMS).

The acceleration sensor may include various sensors such as an acceleration sensor which may be mounted in an airbag system of a vehicle to measure acceleration having a large value used to detect collision and an acceleration sensor which may measure acceleration having a small value used as an input means of a game console. Two-axis or three-axis acceleration sensors may be mounted in one package or only a Z-axis acceleration sensor may be mounted according to use environment. Accordingly, for certain reasons, if a X-axis or Y-axis acceleration sensor is used instead of the Z-axis acceleration sensor, the acceleration sensor may be mounted on a main board in an erect state using a separate board piece.

The gyroscopic sensor measures an angular speed and senses a direction in which the mobile terminal rotates from a reference direction.

The output unit 150 outputs an audio signal, a video signal or an alarm signal. The output unit 150 may include a display 151, an audio output module 153, an alarm unit 155 and a haptic module 157.

The display 151 displays information processed by the mobile terminal 100. For example, if the mobile terminal 100 is in a call mode, the display displays a user interface (UI) or a graphical user interface (GUI) related to a call. If the mobile terminal 100 is in a video call mode or a photographing mode, the display may individually or simultaneously display the photographed or received images and display a UI and a GUI.

As described above, if the display 151 and the touchpad have the layered structure to configure the touchscreen, the display 151 can be used not only as an output device but also as an input device for inputting information via touch.

If the display 151 is a touchscreen, the display may include a touchscreen panel, a touchscreen panel controller, etc. In this case, the touchscreen panel is a transparent panel attached to the outside of the display and may be connected to an internal bus of the mobile terminal 100. The touchscreen panel receives a touch input and sends a signal corresponding to the touch input to the touchscreen panel controller. The touchscreen panel controller processes the received signal, transmits data corresponding to the signal to the controller 180, and enables the controller 180 to detect whether the touch input is received or which portion of the touchscreen is touched.

The display 151 may include e-paper. The e-paper may be a reflection type display and has high resolution, wide viewing angle and excellent visual characteristics due to a bright white background, similarly to paper and ink. The e-paper may be implemented on a certain board such as plastic, metal, or paper, an image is maintained even after power is turned off, and the lifespan of the battery of the mobile terminal 100 may be increased because a backlight power source is not used. As the e-paper, a semispherical twisted ball charged with electric charges, electrophoresis, a microcapsule, etc. may be used.

The display 151 may include at least one of a liquid crystal display, a thin film transistor-liquid crystal display, an organic light emitting diode, a flexible display and a 3-dimensional (3D) display. The number of displays 151 may be two or more according to implementations of the mobile terminal 100. For example, the mobile terminal 100 may include both an external display (not shown) and an internal display (not shown).

The audio output module 153 may output audio data received from the wireless communication module 110 or stored in the memory 160 in call signal reception, a call mode, a recording mode, a voice recognition mode or a broadcast reception mode. The audio output module 153 outputs an audio signal associated with the functions performed by the mobile terminal 100, such as call signal reception sound or message reception sound. The audio output module 153 may include a speaker, a buzzer, etc.

The alarm unit 155 outputs a signal notifying the user that an event has occurred in the mobile terminal 100. Examples of the event which has occurred in the mobile terminal 100 include call signal reception, message reception, key signal input, etc. The alarm unit 155 outputs a signal notifying the user of the occurrence of an event in the other form in addition to an audio or video signal. For example, the alarm unit may output the signal in the form of vibrations. If a call signal or a message is received, the alarm unit 155 may output a signal notifying the user that the call signal or the message has been received. If a key signal is received, the alarm unit 155 may output a signal as a feedback signal of the key signal. The user may recognize occurrence of the event through the signal output from the alarm unit 155. The signal notifying the user that the event has occurred in the mobile terminal 100 may be output through the display 151 or the audio output module 153.

The haptic module 157 generates a variety of tactile effects that the user can feel. A typical example of the tactile effect generated by the haptic module 157 is vibration. If the haptic module 157 generates vibrations as a tactile effect, the intensity and pattern of the vibrations generated by the haptic module 157 may be changed and different vibrations may be combined and output or may be sequentially output.

The haptic module 157 may generate a variety of tactile effects such as an effect due to stimulus through arrangement of pins which vertically move with respect to a contact skin surface, an effect due to stimulus through air ejection force or absorption force through an ejection hole and an absorption hole, an effect due to stimulus through contact of an electrode, an effect due to stimulus using electrostatic force, or an effect due to cold and warmth using a heat absorption or heating element. The haptic module 157 may deliver the tactile effect through direct contact or enable the user to feel the tactile effect through kinaesthesia of a finger or arm of the user. The number of haptic modules 157 may be two or more according to the configuration of the mobile terminal 100.

The memory 160 may store a program for processing and control of the controller 180 and may temporarily store input or output data (for example, a phonebook, messages, audio, still images, and moving images).

The memory 160 may include at least one of a flash memory type, hard disk type, multimedia card micro type or card type memory (e.g., an SD or XD memory, etc.), a RAM and a ROM. The mobile terminal 100 may manage a web storage for performing a storage function of the memory 150 over the Internet.

The interface 170 serves as an interface with all external devices connected to the mobile terminal 100. Examples of the external device connected to the mobile terminal 100 include a wired/wireless headset, an external charger, a wired/wireless data port, a card socket such as a memory card, a subscriber identification module (SIM) card or a user identity module (UIM) card, an audio input/output (I/O) terminal, a video I/O terminal, and an earphone. The interface 170 may receive data from an external device or receive power and transmit power to the components of the mobile terminal 100 or transmit data of the mobile terminal 100 to an external device.

The interface 170 may become a passage through which power is supplied from an external cradle to the mobile terminal 100 when the mobile terminal is connected to the external cradle or a passage through which a variety of command signals received from the cradle by the user is delivered to the mobile terminal 100.

The controller 180 controls the operations of the units and controls the overall operation of the mobile terminal 100. For example, the controller performs control and processing associated with a voice call, data communication, a video call, etc. The controller 180 may include a multimedia reproduction module 181 for multimedia reproduction. The multimedia reproduction module 181 may be implemented in the controller 180 in hardware form or may be implemented in software form separately from the controller 180.

The power supply 190 receives external power or internal power and supplies power required for operation to each component under control of the controller 180.

The mobile terminal 100 having the above configuration includes a wired/wireless communication system and a satellite based communication system so as to operate in a communication system for transmitting data through a frame or packet.

Figure 3:
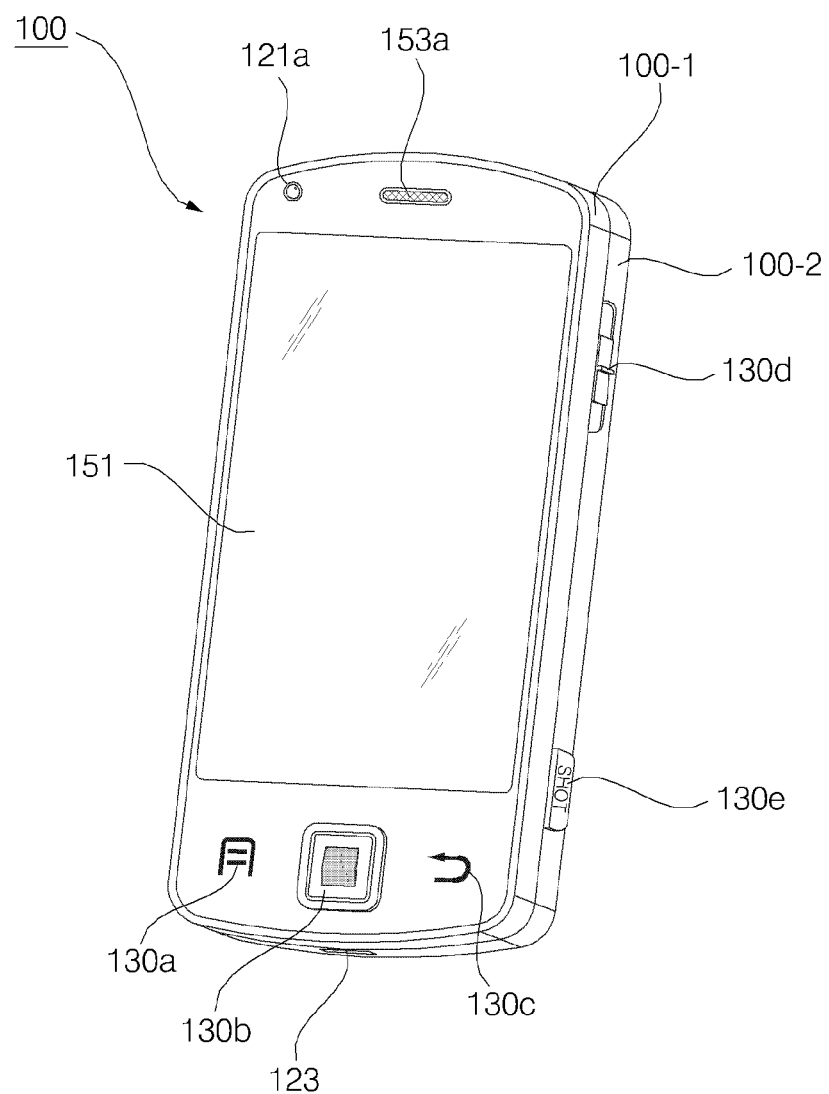
FIG. 3 is a perspective view of the mobile terminal of FIG. 2 when viewed from a front side thereof.
Figure 4:
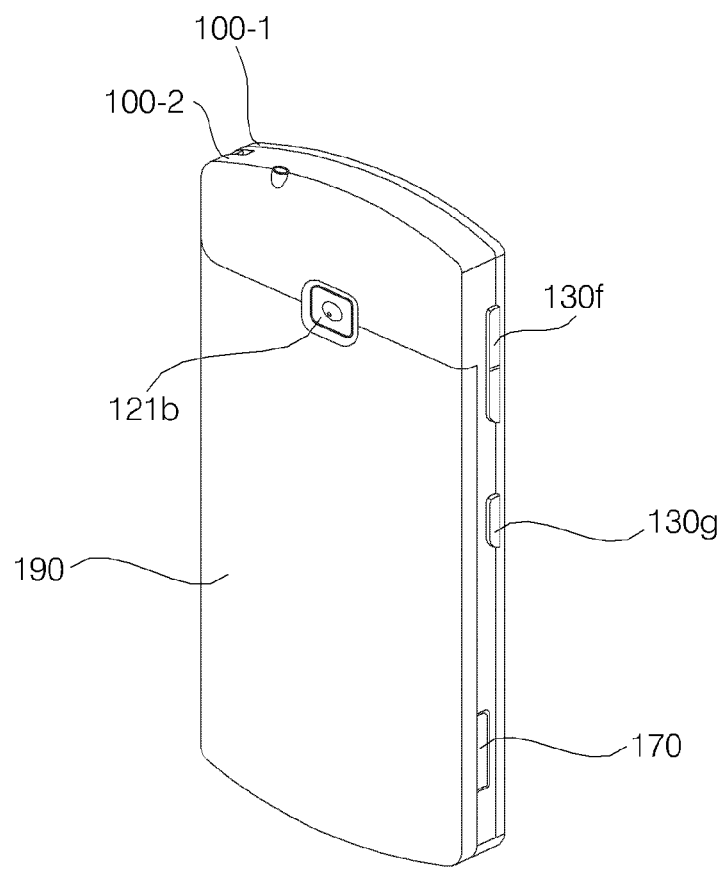
FIG. 4 a perspective view of the mobile terminal of FIG. 3 when viewed from a rear side thereof.

FIG. 3 is a perspective view of a mobile terminal of FIG. 2 when viewed from a front side thereof, and FIG. 4 is a perspective view of the mobile terminal shown in FIG. 3 when viewed from a rear side thereof. Hereinafter, the appearance of the mobile terminal according to the present invention will be described with reference to FIGS. 3 and 4. Hereinafter, for convenience, among folder type, bar type, swing type and slider type mobile terminals, a bar type mobile terminal including a touchscreen at a front side thereof will be described. However, the present invention is not limited to the bar type mobile terminal and is applicable to all types of mobile terminals including the above-described types.

Referring to FIG. 3, a case forming the appearance of the mobile terminal 100 includes a front case 100-1 and a rear case 100-2. In a space formed by the front case 100-1 and the rear case 100-2, various electronic parts are mounted.

In a main body, that is, in the front case 100-1, a display 151, a first audio output module 153a, a first camera 121a and first to third user input units 130a, 130b and 130c are arranged. A fourth user input unit 130d, a fifth user input unit 130e and a microphone 123 may be arranged on the side surface of the rear case 100-2.

The display 151 and a touch pad have the layered structure to configure the touchscreen so as to enable the user to input information through touch.

The first audio output module 153a may be implemented in the form of a receiver or a speaker. The first camera 121a may be implemented in a form suitable for photographing an image of the user or capturing moving image of the user. The microphone 123 may be implemented in a form suitable for receiving user voice or other sounds.

The first to fifth user input units 130a, 130b, 130c, 130d and 130e and the below-described sixth and seventh user input units 130f and 130g may be collectively referred to as a user input unit 130 and any tactile manner for operating the mobile terminal while providing a tactile effect to the user may be employed.

For example, the user input unit 130 may be implemented in the form of a dome switch or a touch pad which is capable of receiving a command or information by a push or touch operation of the user or in the form of a jog wheel for rotating a key, or a joystick. The first to third user input units 130a, 130b and 130c are used to input a command such as start, end, scroll, etc. and the fourth user input unit 130d is used to input choice of an operation mode. The fifth user input unit 130e may function as a hot key for activating a special function of the mobile terminal 100.

Referring to FIG. 4, a second camera 121b may be mounted on a rear surface of the rear case 100-2 and the sixth and seventh user input units 130f and 130g and an interface 170 are disposed on a side surface of the rear case 100-2.

The second camera 121b has a photographing direction substantially opposite to that of the first camera 121a and may have pixels different from those of the first camera 121a. A flash (not shown) and a mirror (not shown) may be further provided near the second camera 121b. Another camera may further be mounted near the second camera 121b to be used to capture a three-dimensional image.

The flash illuminates a subject when the subject is captured using the second camera 121b. The mirror enables the user to view his/her face when the picture of the user is taken by himself/herself using the second camera 121b (self photographing).

In the rear case 100-2, a second audio output module (not shown) may further be included. The second audio output module may perform a stereo function along with the first audio output module 153a and may be used for a call in a speakerphone mode.

The interface 170 may be used as a passage through which data is exchanged with an external device. A broadcast signal reception antenna (not shown) may be provided in one of the front case 100-1 and the rear case 100-2 in addition to an antenna for telephone call. The antenna may be retractable from the rear case 100-2.

A power supply 190 for supplying power to the mobile terminal 100 may be mounted at the side of the rear case 100-2. The power supply 190 is, for example, a rechargeable battery and may be detachably coupled to the rear case 100-2, for charging.

Although the second camera 121b is mounted on the rear case 100-2 in the above description, the present invention is not limited thereto. Alternatively, the second camera 121b may not be separately included, but the first camera 121a may be rotatably formed to photograph a subject located in the photographing direction of the second camera 121b.

Figure 5:
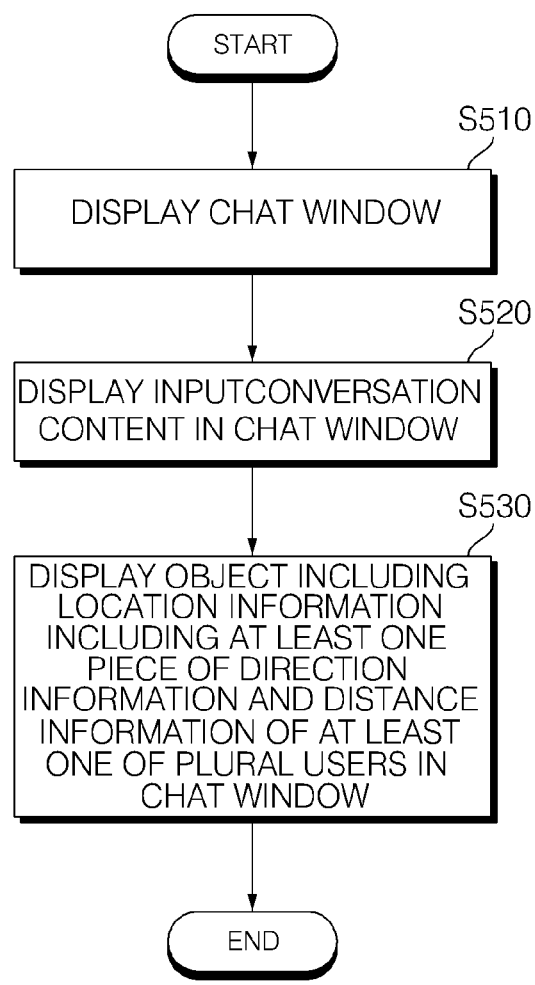
FIG. 5 is a flowchart illustrating a method for operating an image display apparatus according to an embodiment of the present invention.

FIG. 5 is a flowchart illustrating a method for operating an image display apparatus according to embodiments of the present invention, and FIGS. 6a to 12c are views referred to for describing a method for operating the image display apparatus of FIG. 5.

The mobile terminal 100 which is an example of an image display apparatus will be described with reference to FIGS. 6a to 12c.

The mobile terminal 100 displays a chat window for conversation with other users (S510). The chat window may be displayed when entering a conversation mode. The controller 180 of the mobile terminal 100 may control display of the chat window on the display if user input for entering the conversation mode is received.

Next, the mobile terminal 100 displays conversation content in the chat window (S520). The mobile terminal 100 may control display of the conversation content input by a user or the other users in the chat window.

The mobile terminal 100 may receive or transmit a conversation mode entrance signal from or to the other users when entering the conversation mode. The mobile terminal 100 may display the conversation content input by the user of the mobile terminal 100 or the conversation content, which is input by the other users and received by the mobile terminal 100.

Figure 6A:
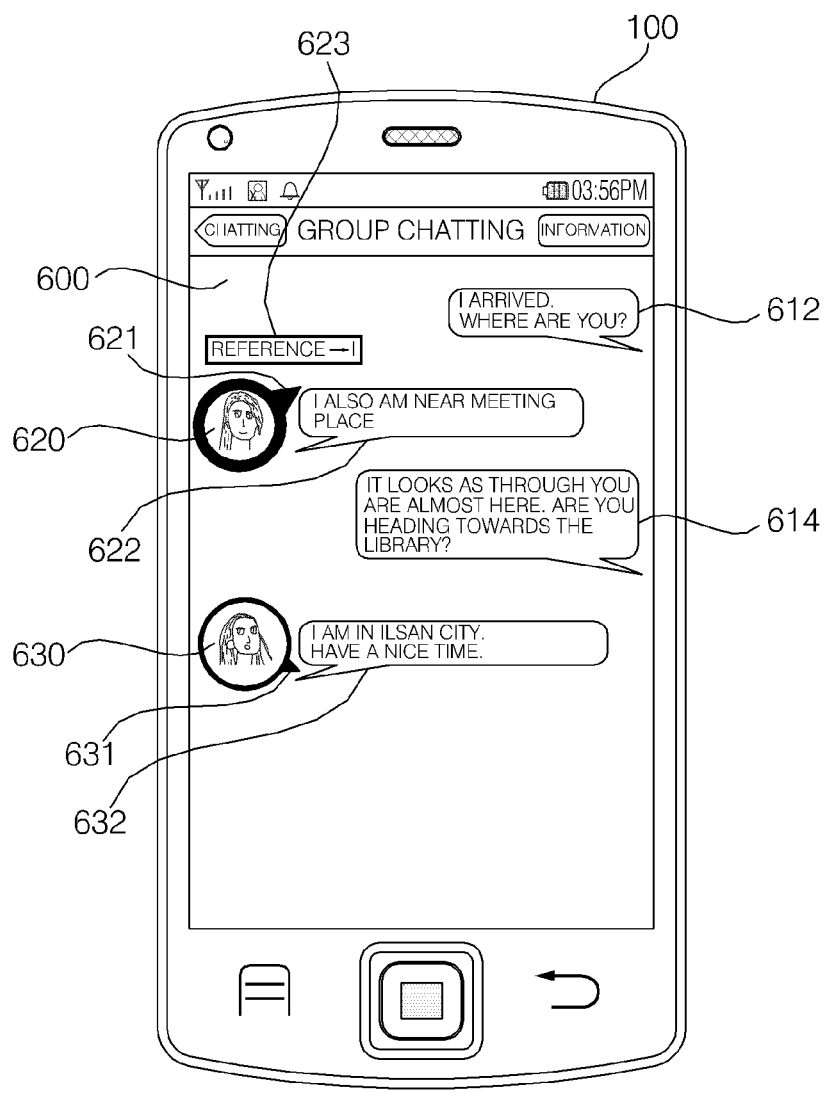
FIGS. 6a to 12c are views referred to for describing a method for operating an image display apparatus of FIG. 5.

FIG. 6a shows the chat window 600 displayed on the mobile terminal and conversation content among the user of the mobile terminal 100 and two external users in the chat window.

More specifically, FIG. 6a shows display of conversation content 612 and 614 of the user of the mobile terminal 100, an image 620 indicating a first external user, an image 630 indicating a second external user, conversation content 622 of the first external user and conversation content 632 of the second external user.

The first image display apparatus 100a shown in FIG. 1 may be an image display apparatus used by the user of the mobile terminal 100 of FIG. 6a, the second image display apparatus 100b may be an image display apparatus used by the second external user of FIG. 6a, and the third image display apparatus 100c may be an image display apparatus used by the third external user of FIG. 6a.

Next, the mobile terminal 100 displays an object indicating location information including at least one of direction information and distance information of one or more other users in the chat window (S530).

The mobile terminal 100 may receive the location information including the direction information and the distance information of the other users if the user chats with the other users via the chat window.

Based on the received location information, the controller 180 of the mobile terminal 100 may control display the location information including at least one of the direction information and the distance information of the external users.

Referring to FIG. 6a, the wireless communication unit 110 of the mobile terminal 100 may receive the location information from the first external user and receive the location information from the second external user. The controller 180 of the mobile terminal 100 may control generation and display of an object intuitively indicating the location information based on the location information received from the first external user and the location information received from the second external user.

More specifically, in FIG. 6a, if the user of the mobile terminal 100 is located in a northeast direction of the first external user and a distance between the user of the mobile terminal 100 and the first external user is small, an object 621 indicating the northeast direction may be displayed while the line thickness of the image 620 indicating the first external user is large. Although an arrow is shown as the object 621 indicating the northeast direction in the figure, various shapes may be used.

As shown in FIG. 6a, the object 623 indicating the reference location may be displayed together with the object 21 indicating the northeast direction. In the figure, the direction is displayed based on the user of the mobile terminal 100, that is, "I". The user may conveniently recognize the reference location of the object 621 indicating the direction.

In FIG. 6a, if the user of the mobile terminal 100 is located in a southeast direction of the second external user and a distance between the user of the mobile terminal 100 and the second external user is large, an object 631 indicating the southeast direction may be displayed while the line thickness of the image 630 indicating the second external user is small. Although an arrow is shown as the object 631 indicating the southeast direction in the figure, various shapes may be used.

In the figure, since the sizes of the objects 621 and 631 indicating the direction are changed, the distance information may be displayed. Accordingly, it is possible to intuitively confirm the directions and distances of the other users. Therefore, it is possible to increase user convenience.

The mobile terminal 100 may update and display conversation content and location information of the user.

Figure 6B:
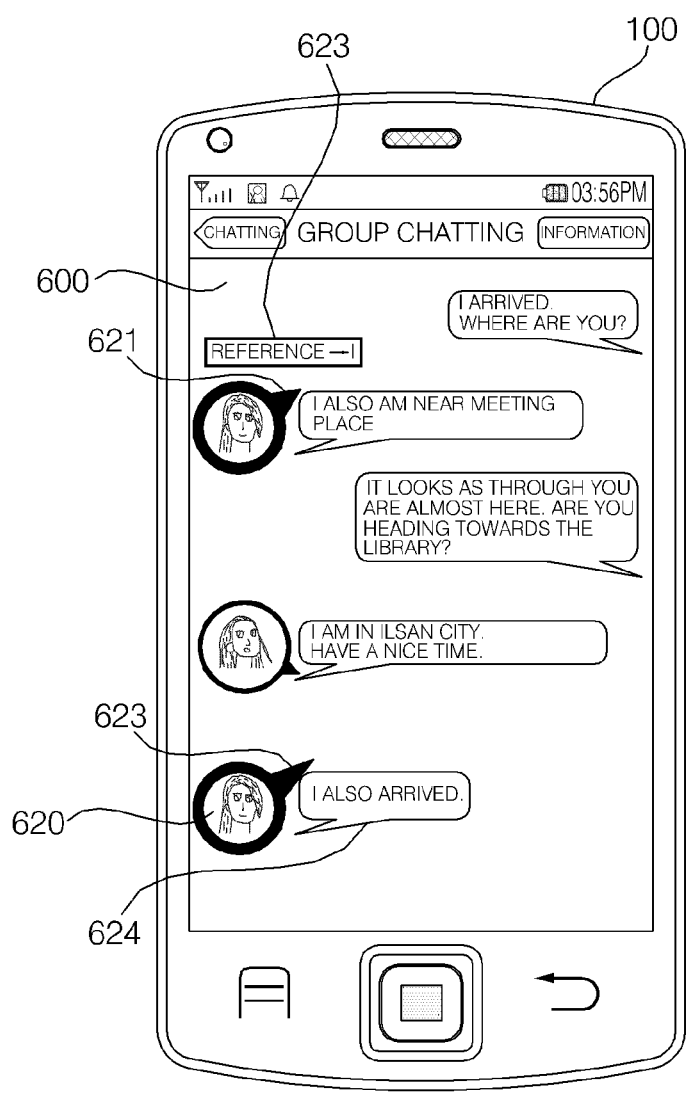

FIG. 6b shows display of additional conversation content 624 from the second external user on the mobile terminal 100 in addition to the existing conversation content.

The updated conversation content and location information of the other users may be received via the wireless communication unit 110 of the mobile terminal 100. At this time, if the updated location information of another user is closer to the user of the mobile terminal 100, the size of the object indicating the location information may be increased.

In FIG. 6b, in addition to the conversation content 624 of the first external user, an object 623 indicating the northeast direction is displayed while the line thickness of the image 620 indicating the first external user is increased. It can be seen that the size of the object 623 indicating the northeast direction is greater than that of the object 621, through comparison with FIG. 6a. Accordingly, the user of the mobile terminal 100 can confirm that the first user is located near the user of the mobile terminal 100.

In the figure, the object 623 indicating the reference location and the object 621 indicating the direction may be displayed together.

Figure 6C:
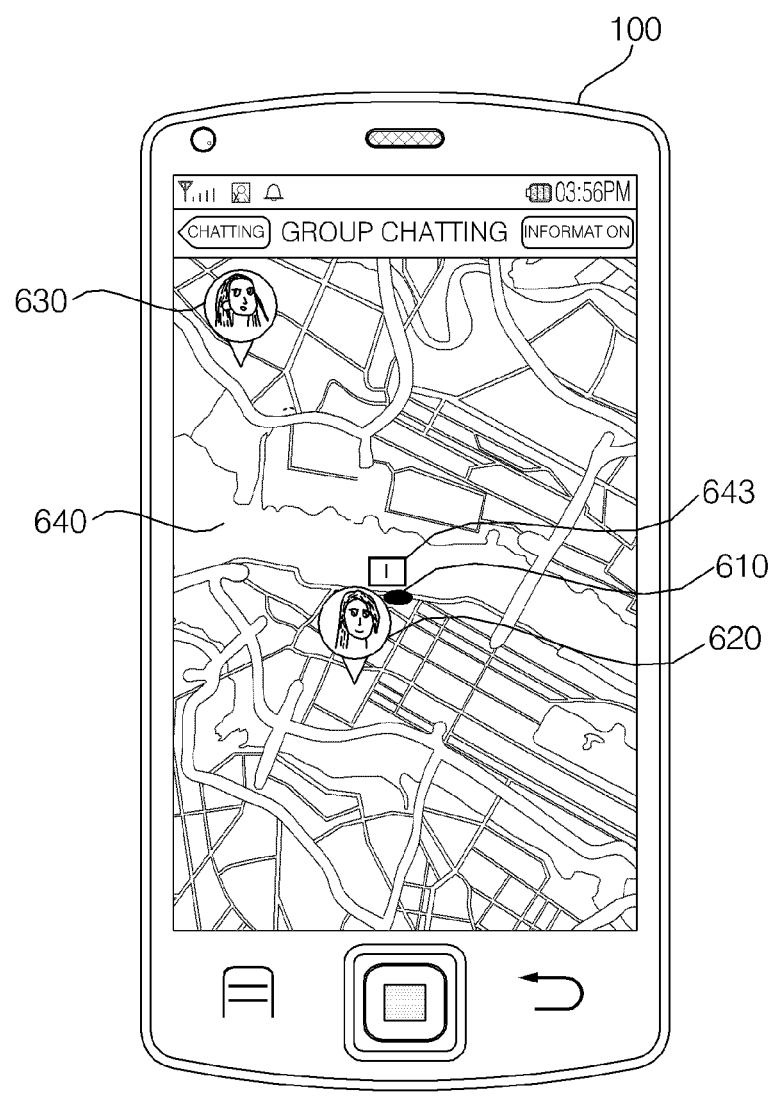

If input for displaying a map is received from the user of the mobile terminal 100, as shown in FIG. 6c, images 620 and 630 respectively indicating the first external user and the second external user may be displayed together with a map image 640. The object 610 indicating the location of the user of the mobile terminal 100 and text 643 indicating the user may be displayed on the map image 640. Accordingly, it is possible to confirm the location information of the other users on the map.

Input for displaying the map may be input for displaying any one or both of the direction objects 621 and 631.

Referring to FIG. 6a, the direction objects 621 and 631 indicate the direction of the user of the mobile terminal 100 relative to the other users, and vice versa. That is, the locations of the other users relative to the user of the mobile terminal 100 may be indicated.

The direction objects 621 and 631 of FIG. 6a may be displayed when the location information is received from the external users.

Alternatively, the direction objects 621 and 631 of FIG. 6a may be automatically displayed if a specific word is displayed in the chat window 600. For example, if a word for deciding a meeting place, such as "arrive" or "where", is used, the direction objects shown in FIG. 6a indicating the location information may be automatically displayed in the chat window. Therefore, the user can confirm the location information of the other users.

Figure 7:
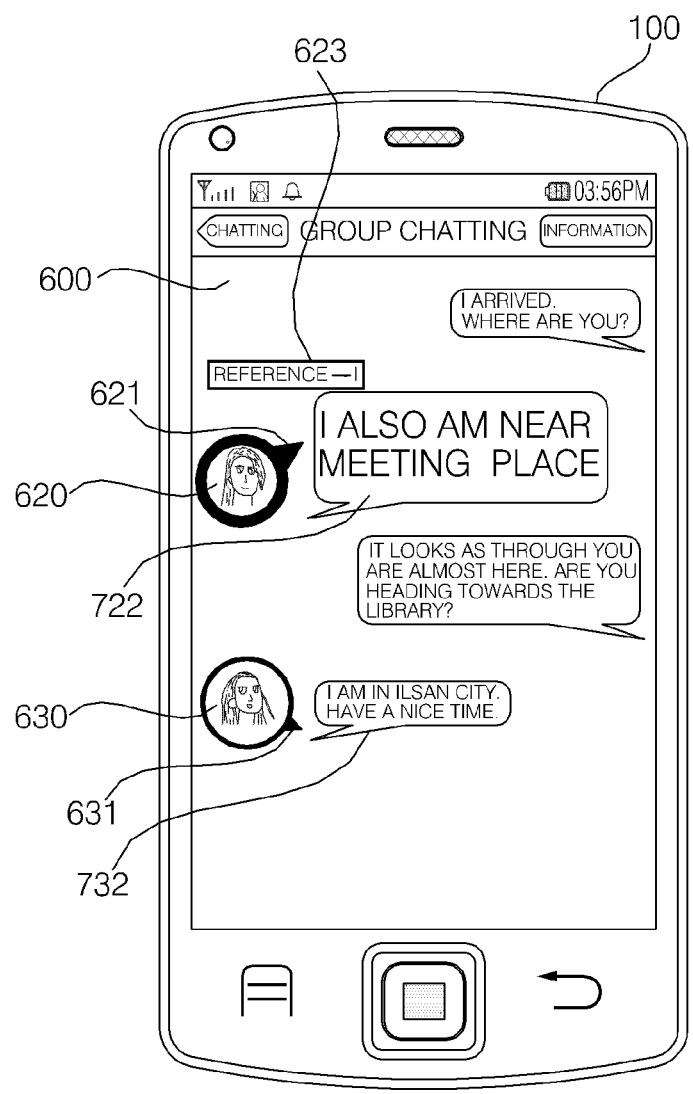

FIG. 7 shows another example of displaying location information in a chat window.

Referring to FIG. 7, the controller 180 of the mobile terminal 100 may control display of the chat window such that the size of conversation content from the other user increases as the location of the other user is closer to the location of the user of the mobile terminal 100.

In FIG. 7, the size of the conversation content 722 of the first external user is increased in proportion to the size of the direction object 621 and the size of the conversation content 732 of the second external user is decreased in proportion to the size of the direction object 631. Therefore, the user can intuitively confirm the distances from the other users.

In addition, the controller 180 of the mobile terminal 100 may change at least one of a size, a length, a line thickness and transparency of the object indicating the location information or at least one of italicization or transparency of text displayed in the chat window, according to the direction information or the distance information.

For example, italicization of text may indicate the direction indicated by the direction object. As another example, transparency of the object or text may be increased as the distance from the other user is decreased.

Figure 8:
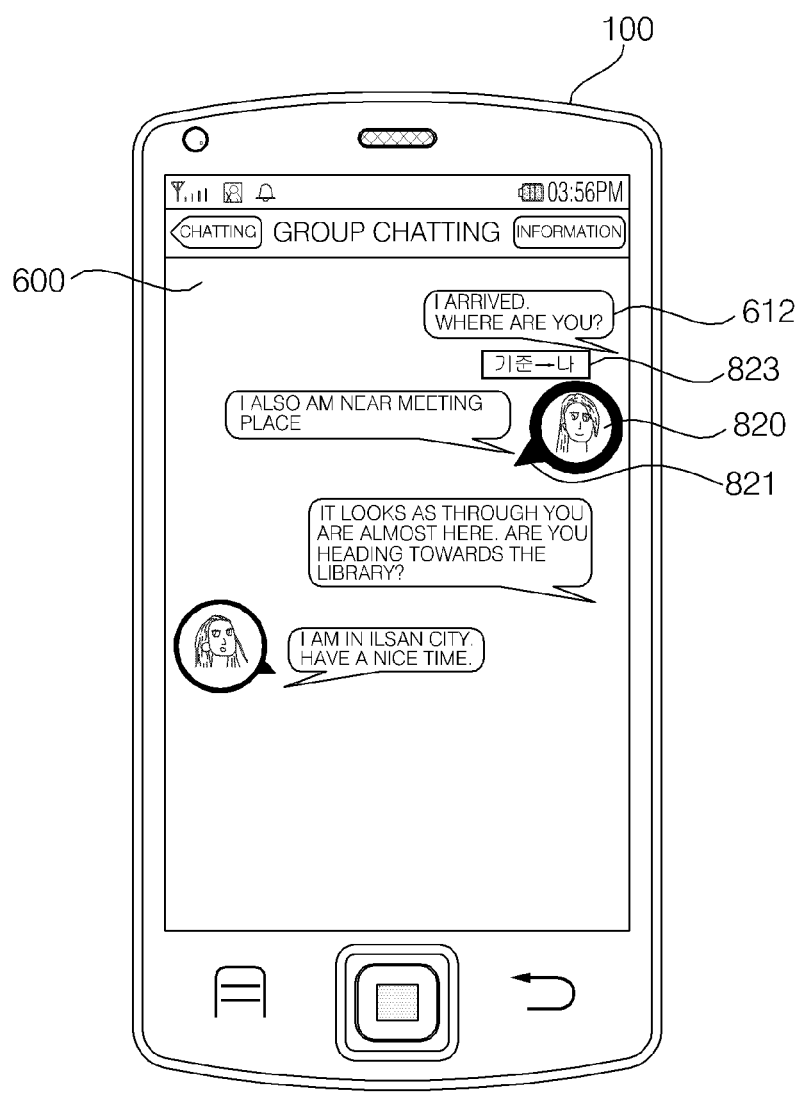

FIG. 8 shows the case in which the display location of the object displayed in the chat window is changed according to the location information of each user.

For example, if the first user is located in the northeast direction of the user of the mobile terminal 100 and the second user is located in the northwest direction of the user of the mobile terminal 100, the image 820 indicating the first user and the direction object 821 of the first user may be displayed to the right of the chat window. The image indicating the second user and the direction object of the second user may be displayed on the left of the chat window. Therefore, the user may intuitively confirm the locations of the other users.

As shown in FIG. 8, the object 823 indicating the reference location and the object 821 indicating the direction may be displayed together. Therefore, the user may conveniently recognize the reference location of the object 821 indicating the direction.

Figure 9A:
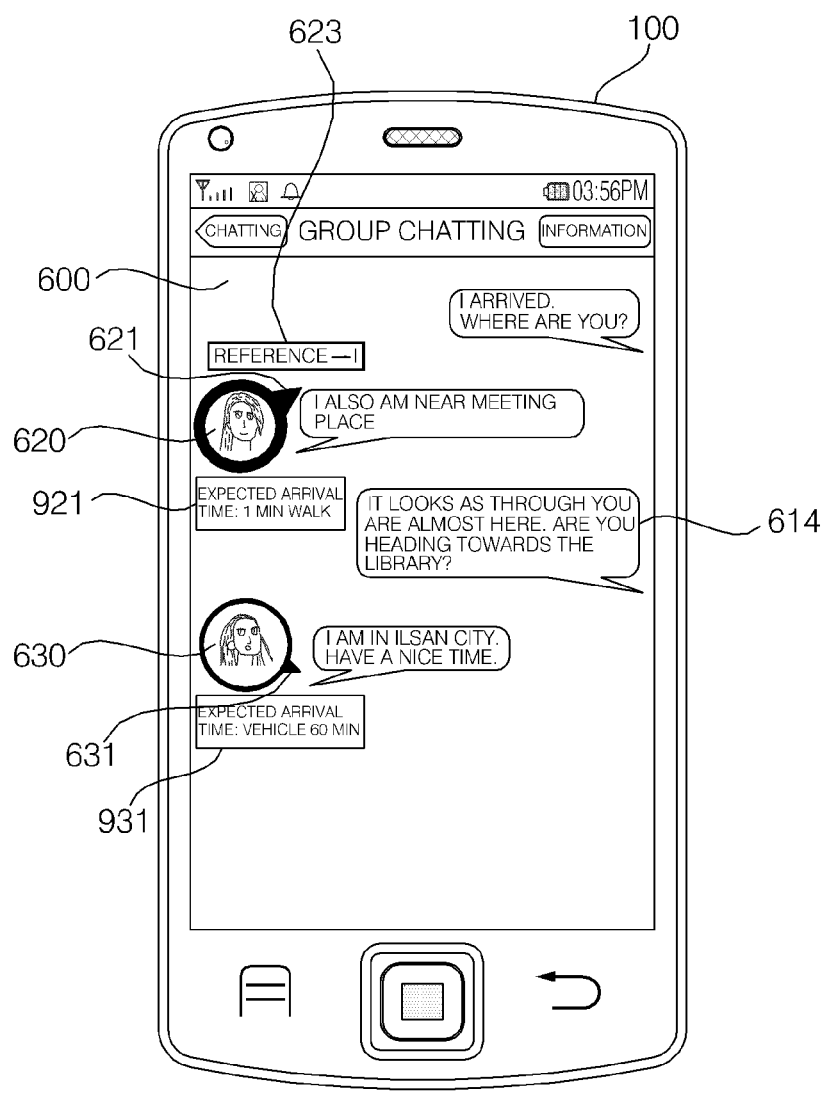

FIG. 9a shows display of an object indicating information about an expected arrival time for a specific area.

Referring to FIG. 9a, similarly to FIG. 6a, the conversation content, the images 620 and 630 indicating the first and second users and the objects 621 and 631 indicating the distances and directions of the first and second users are displayed. In addition, the information about the expected arrival times 921 and 931 of the first and second users for the specific area may also be displayed.

The controller 180 of the mobile terminal 100 may control generation and display of the information about the expected arrival times for a meeting place, such as "walking 1 min" 921 and "vehicle 60 min" 931, using the location information of the first and second users. Therefore, the user may conveniently confirm the arrival times of the other users.

The controller 180 of the mobile terminal 100 may control display of the object 823 indicating the reference location and the object 821 indicating the direction. Therefore, the user can conveniently recognize the reference location of the object 821 indicating the direction.

Figure 9B:
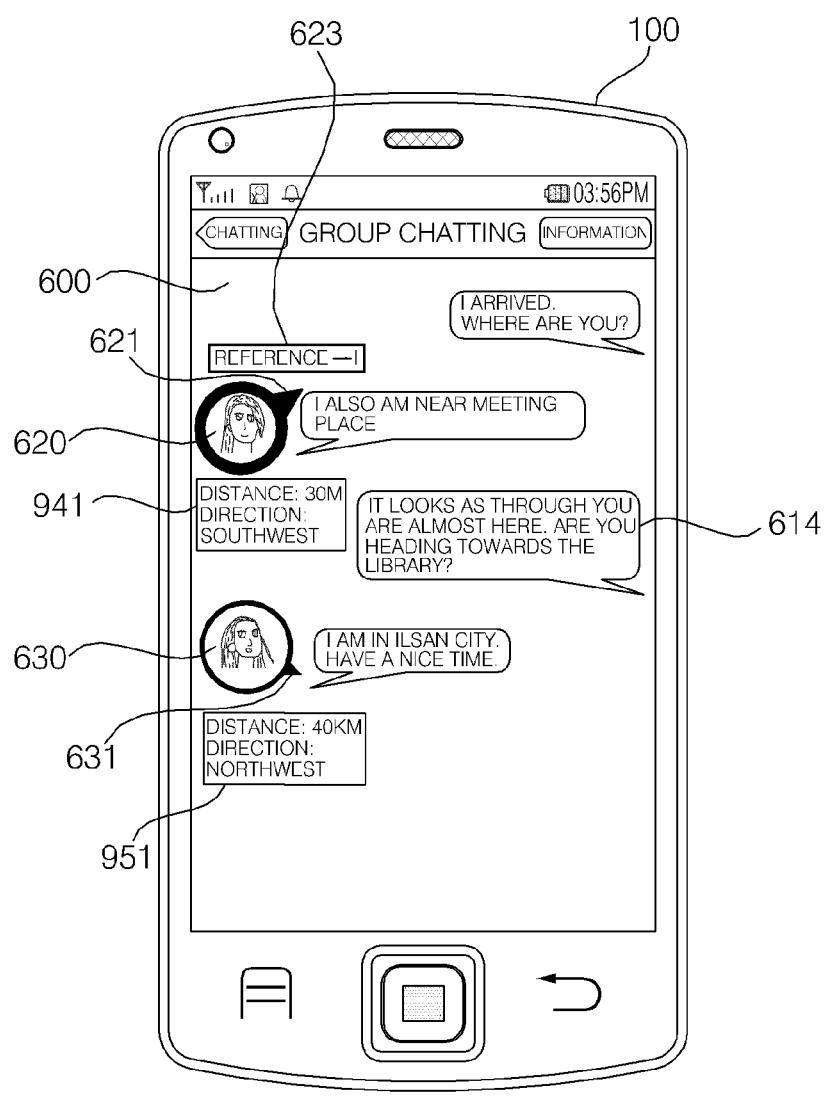

FIG. 9b shows display of the object indicating the direction and the distance information and the direction information in the form of text.

The controller 180 of the mobile terminal 100 may display the distance information and direction information of the other users, which is received via the wireless communication unit 110, in the form of text, in addition to the object.

In FIG. 9b, based on the user "I" of the mobile terminal 100, text "distance: 30 m and direction: southwest" 941 is displayed as location information of the first user and text "distance: 40 km and direction: northwest" 951 is displayed as location information of the second user. Accordingly, the user can confirm the location information of the other users.

FIGS. 10a to 10d show another example of displaying a chat window and location information.

Figure 10A:
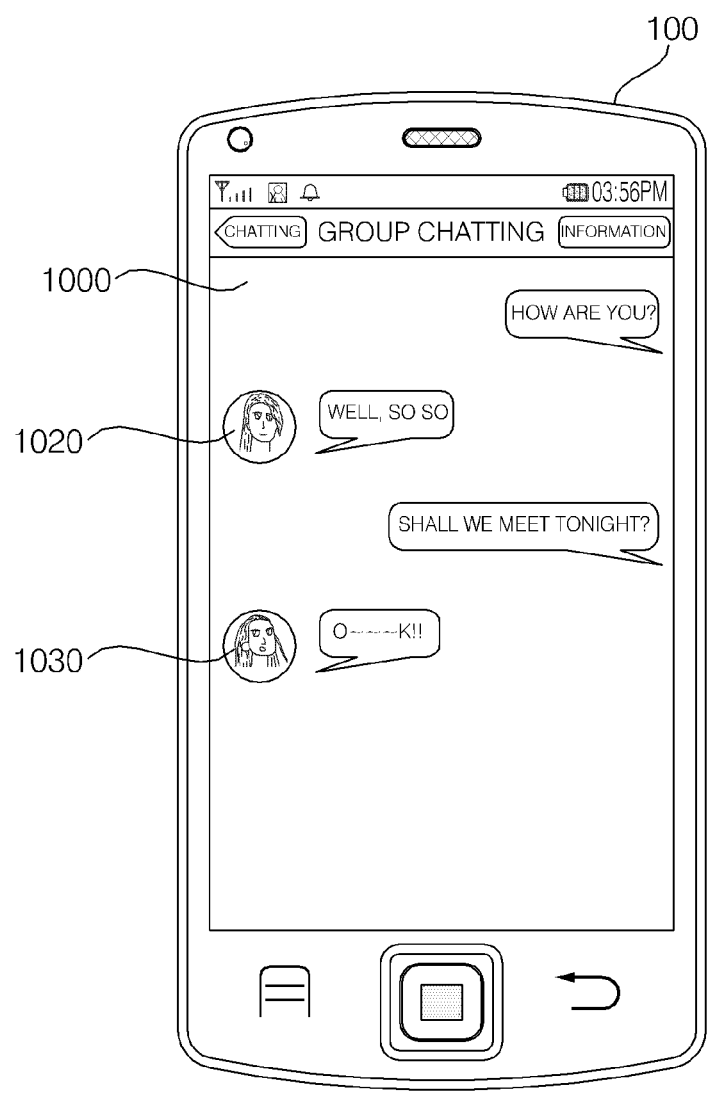

First, FIG. 10a shows display of conversation content of the user of the mobile terminal 100 and the external users in the chat window 1000. In FIG. 10a, images 1020 and 1030 respectively indicating the first and second users are displayed.

Figure 10B:
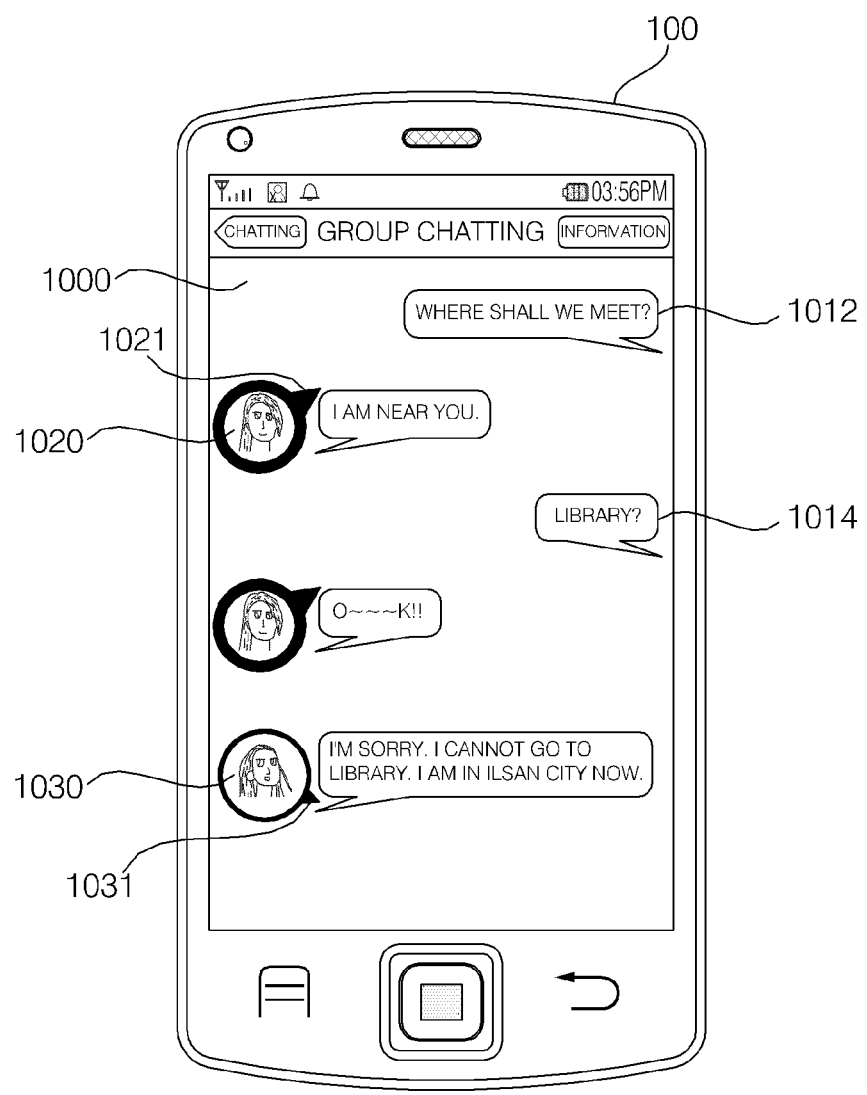

FIG. 10b shows objects 1021 and 1031 indicating the location and direction information of the first and second users in addition to the images 1020 and 1030 respectively indicating the first and second users.

As described above, the wireless communication unit 110 of the mobile terminal 100 may receive the location and direction information of the first and second users.

The controller 180 of the mobile terminal 100 may control automatic display of the objects 1021 and 1031 indicating the location and direction information in the chat window if a specific word (e.g., "where") is used and displayed in the chat window 1000. Therefore, the user can conveniently confirm the location information of the other users.

In the figure, the directions of the objects 1021 and 1031 are determined based on the current location of the mobile terminal 100.

FIG. 10b shows the case in which a plurality of users decides a meeting place through chatting.

Figure 10C:
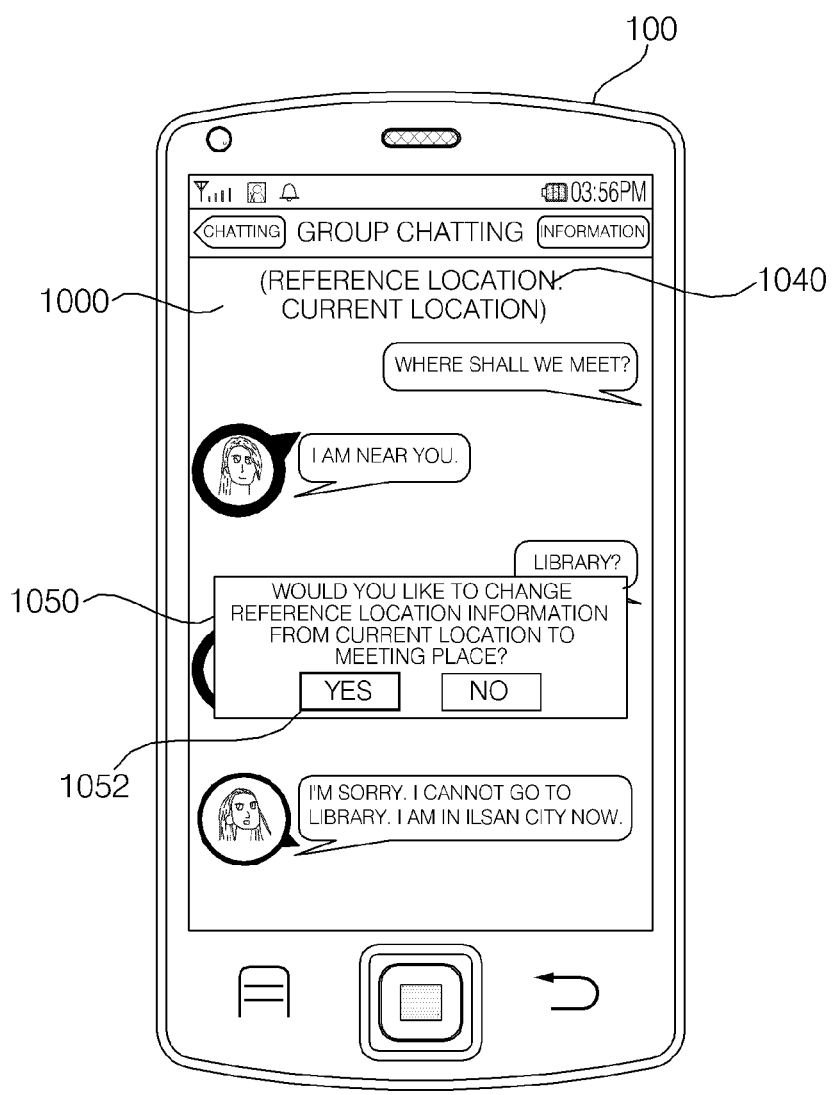

FIG. 10c shows display of an object 1040 indicating that the direction of the direction object is determined according to the current location.

At this time, if user input for changing a reference location is received, as shown, an object 1050 asking whether the reference location is changed may be displayed in the chat window 1000.

Figure 10D:
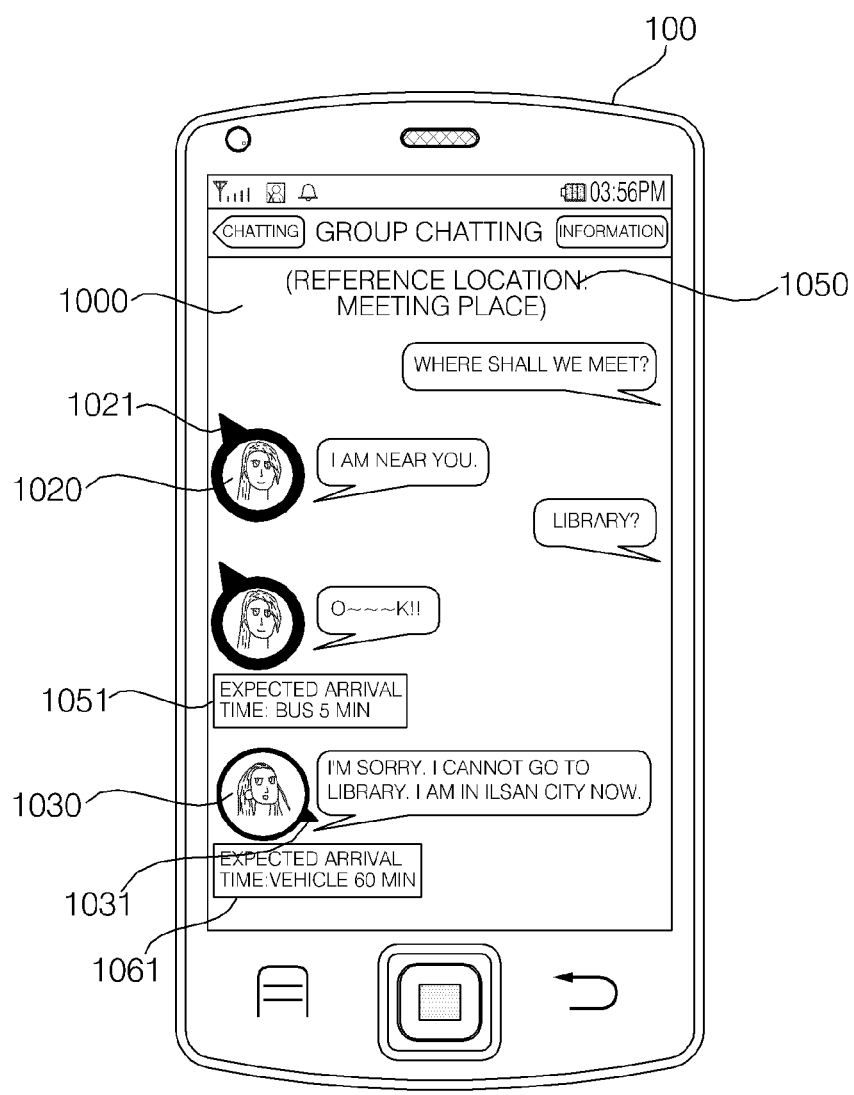

If a change item 1052 is selected, as shown in FIG. 10d, the direction of the direction object may be determined according to meeting place. Accordingly, the direction of the direction object 1021 indicating the direction of the first external user may be changed, as compared to FIG. 10c.

The controller 180 of the mobile terminal 100 may control display of the objects 1051 and 1061 indicating expected arrival times of the other users if the location and direction objects of the other users are displayed according to meeting place. When the meeting place is decided, since the directions, movement distances and expected arrival times of the users are considered, it is possible to increase user convenience.

Figure 11A:
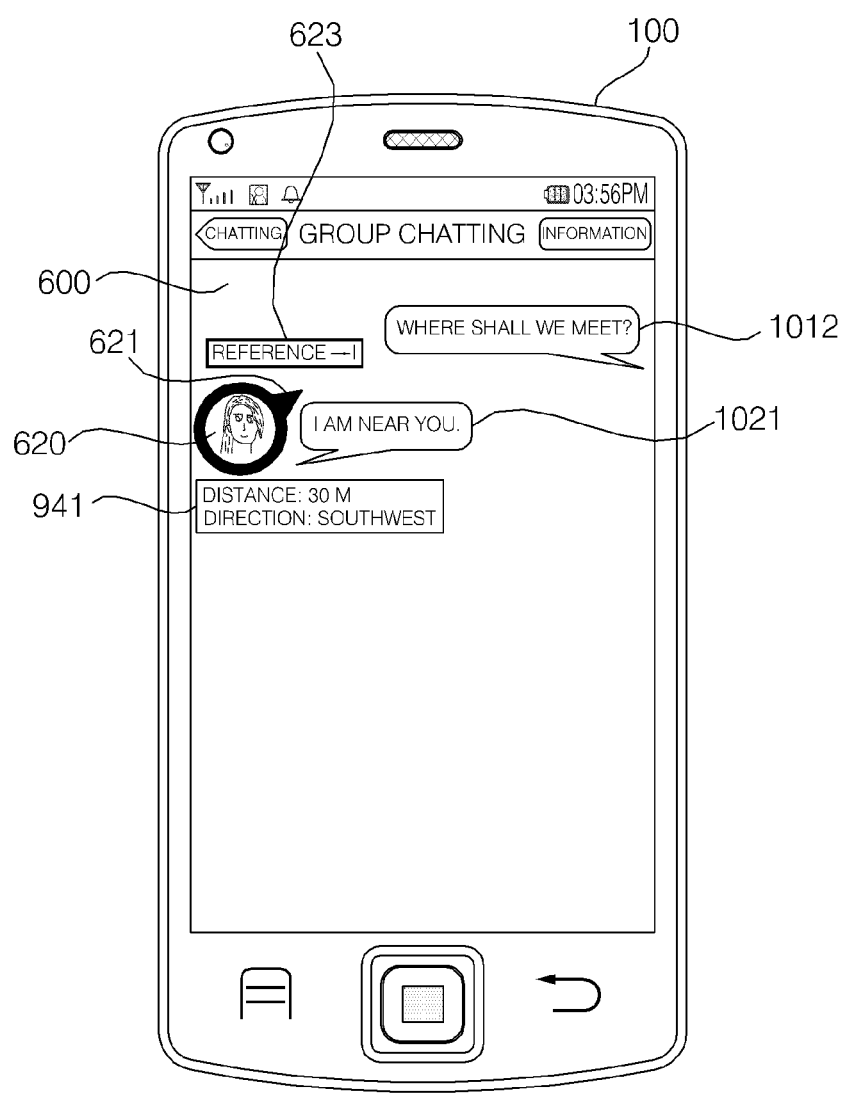
Figure 11B:
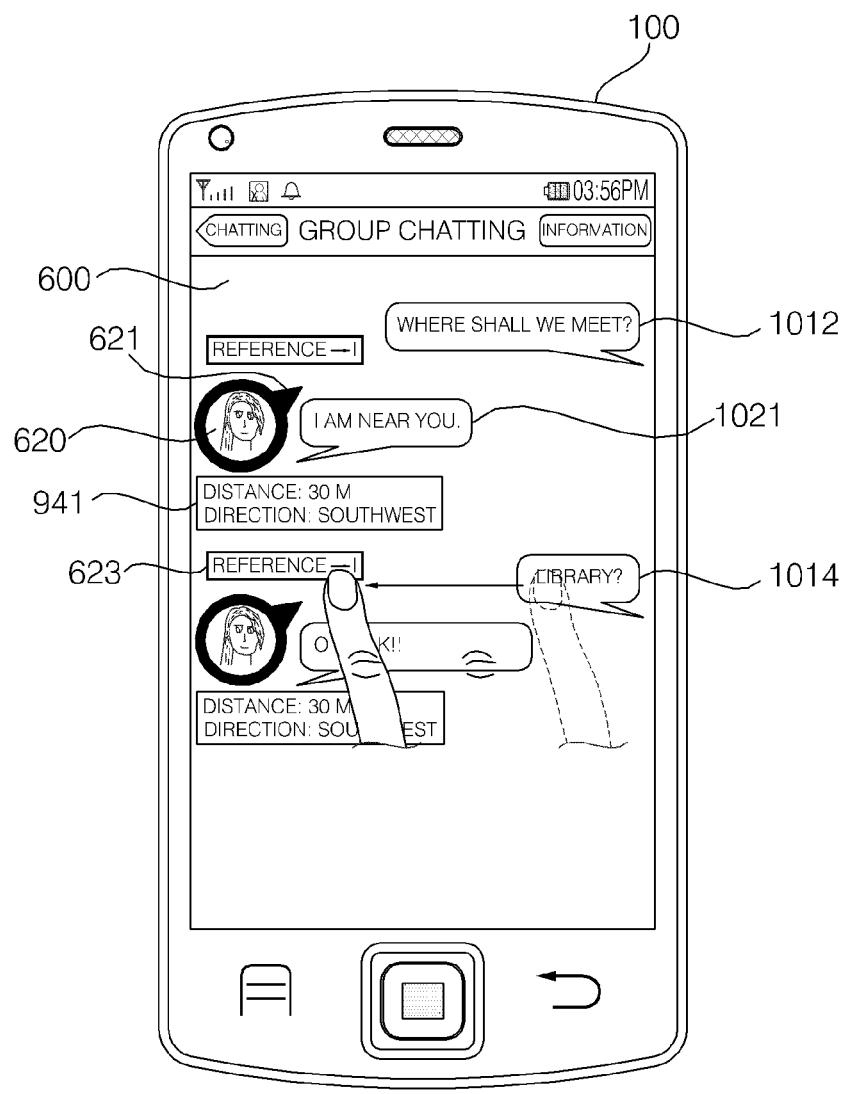
Figure 11C:
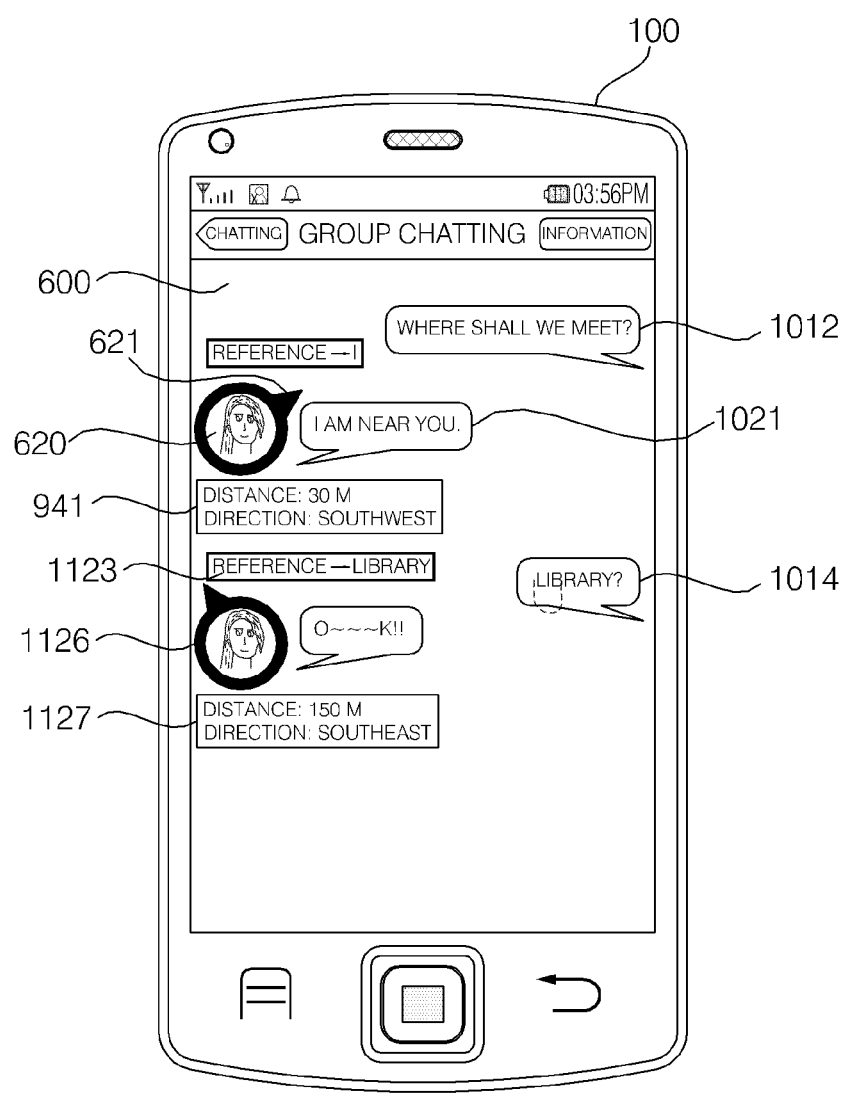

FIGS. 11a to 11c show another example of displaying a chat window and location information.

First, FIG. 11a shows conversation content 1012 and 1021 between the user of the mobile terminal 100 and an external user in the chat window 600. FIG. 11a shows an image 620 indicating the first user.

FIG. 11a shows an object 621 indicating the location information of the first user in addition to the image 620 indicating the first user. As shown, an object 623 indicating a reference location may be displayed together with the object 621 indicating the direction.

FIG. 11b shows display of additional conversation content 1014 in the chat window 600 in addition to FIG. 11a. In particular, an area-related word "library" is displayed in the chat window.

At this time, if the user touches and drags the additional conversation content 1014 including the area-related word "library" to the object 623 indicating the reference direction, the reference location may be changed from the user "I" of the mobile terminal 100 to a specific area "library" by user input.

As shown in FIG. 11c, an object 1123 indicating the changed reference location "library" may be displayed and the object 621 indicating the location information of the first user may be changed to an object 1126 indicating a northwest direction. The text information 941 indicating the distance and location may be changed to text information 1127 indicating the distance and direction information of the changed reference location.

Therefore, the location information may be displayed based on the reference location desired by the user. Accordingly, it is possible to increase user convenience.

Although the reference location is changed by user input and, more particularly, drag-and-drop input in FIG. 11b, the controller 180 of the mobile terminal 100 may change the direction and distance of the object indicating the location information of the first user based on area information if an area-related word is displayed in the chat window.

Figure 12A:
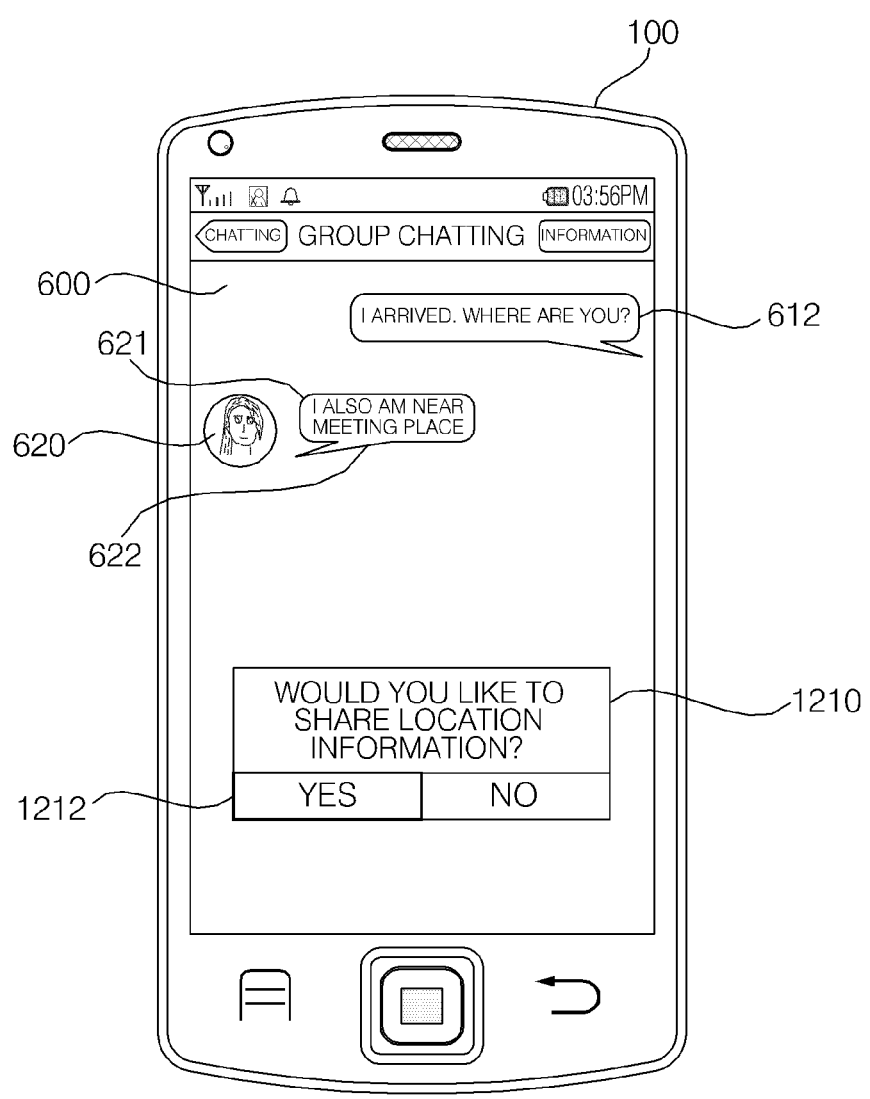
Figure 12B:
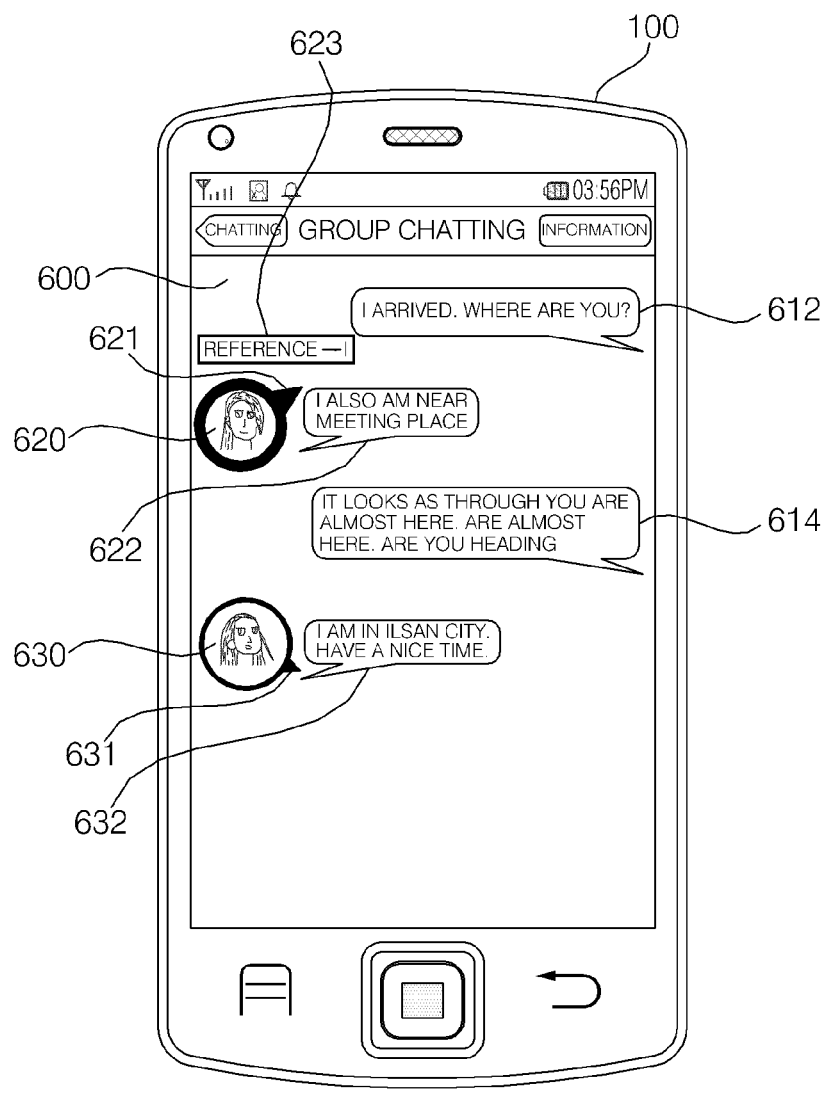
Figure 12C:
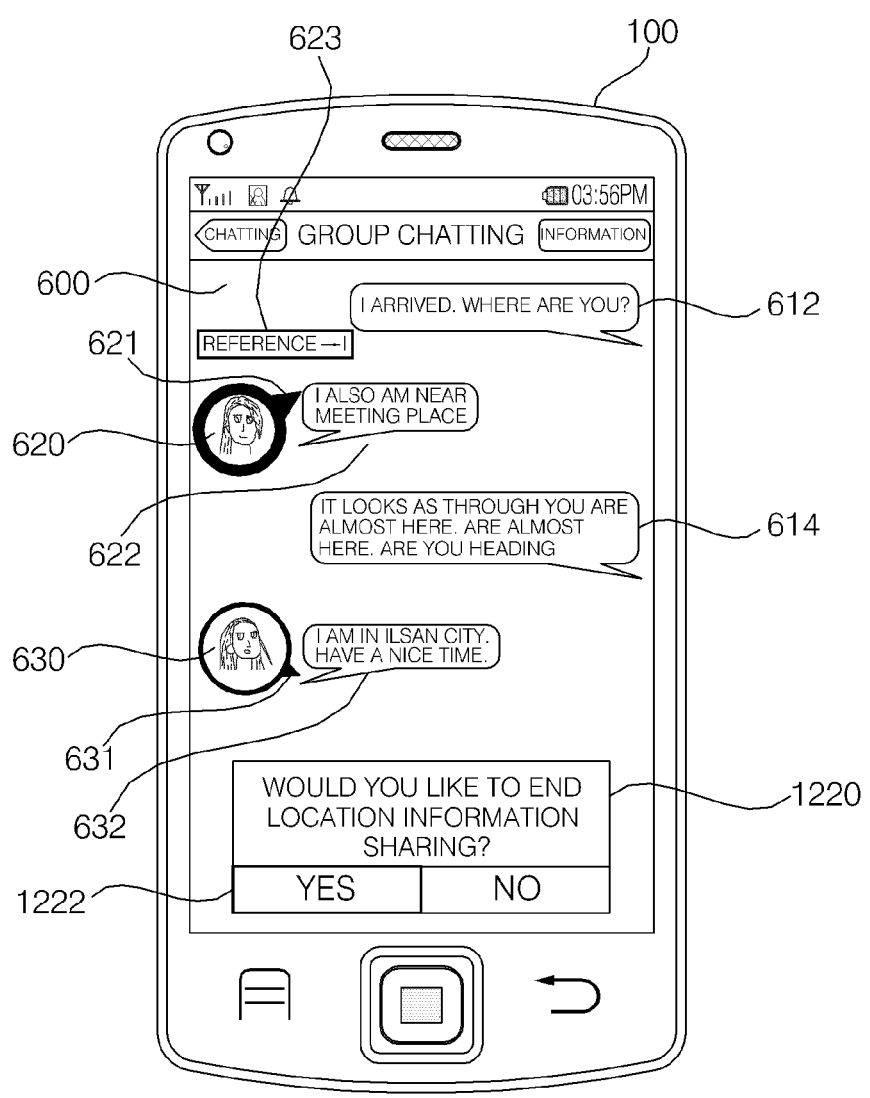

FIGS. 12a to 12c show a location information sharing start and end method in a state of displaying a chat window.

First, FIG. 12a shows conversation content 612 and 622 of the user of the mobile terminal 100 and another user. In FIG. 12a, an image 620 indicating the first user is also displayed.

At this time, a message 1210 for asking whether or not location information is shared may be displayed in the chat window 600, as shown in FIG. 12a.

At this time, if a sharing item 1212 is selected, the mobile terminal 100 of the user and the terminal of another user share location information of each other. That is, the communication unit 110 of the mobile terminal 100 may receive the location information of another user and transmit the location information thereof to another terminal.

As shown in FIG. 12b, based on location information sharing, in addition to conversation content 612, 614, 622 and 632, an image 620 indicating a first external user and an image 630 indicating a second external user, an object 621 indicating the location information of the first external user and an object 631 indicating the location information of the second external user may be displayed in the chat window 600. At this time, an object 623 indicating the reference location of the location information may also be displayed.

FIG. 12c shows display of a message 1220 for asking whether or not location information sharing ends in the chat window in addition to the conversation content, the images indicating the users and the objects indicating the location information.

At this time, if a sharing end item 1222 is selected, location information sharing between the mobile terminal 100 of the user and the terminal of the external user may end. That is, the communication unit 110 of the mobile terminal 100 may stop reception of the location information of another user and stop transmission of the location information thereof. Therefore, the location information is not updated.

Location information sharing may automatically end when the chat window is closed, unlike FIG. 12c.

According to one embodiment of the present invention, an object indicating location information including at least one of direction information and distance information of other users is displayed in a state of displaying a chat window for conversation with the other users. Accordingly, it is possible to intuitively confirm the direction and distance information of the other users. Thus, it is possible to increase user convenience.

In particular, at least one of a size, a length, a line thickness and transparency of an object or a size, italicization and transparency of text displayed in the chat window may be changed according to the direction information or the distance information. Accordingly, it is possible to confirm the location information of the other users.

The object indicating the location information may be updated and displayed. Accordingly, it is possible to immediately confirm change in location information of the other users.

The display location of the object may be changed according to the location of each user. Accordingly, it is possible to confirm the location of the user.

Input for changing a reference location of location information may be received and the changed location information may be displayed according to the changed reference location. Accordingly, the user can confirm the locations of the other users according to desired reference location.

The mobile terminal and the method for operating the same according to the foregoing embodiments are not restricted to the embodiments set forth herein. Therefore, variations and combinations of the exemplary embodiments set forth herein may fall within the scope of the present invention.

The method for operating an image display apparatus according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. An image display apparatus comprising:
a display displays a chat window and displays input conversation content in the chat window, wherein the chat window includes the input conversation content and an image indicating at least one external user;
a communication unit receives location information including direction information and distance information of the at least one external user; and
a controller coupled to the display and the communication unit, wherein the controller is configured to:
display the input conversation content in the chat window,
when a specific word related the meeting place is displayed in the chatting window, generate and display a first object on the display indicating location information between a user of the image display apparatus and a first external user without displaying a map image in the chat window when entering into a conversation mode with the first external user,
based on the location information, generate an expected arrival time information of the first external user for a specific area, and
display a second object indicating the expected arrival time information without displaying the map image in the chat window,
wherein the first object includes an arrow object indicating direction information of the first external user, and a thickness object indicating distance information between the user of the image display apparatus and the first external user or distance information between a meeting place and the first external user,
wherein thickness of the thickness object increases as the distance information between the user of the image display apparatus and the first external user or the distance information between the meeting place and the first external user decreases, and
wherein the arrow object and the thickness object of the first object encircles a first image indicating the first external user, and the second object indicating the expected arrival time information is displayed below the first object.

2. The image display apparatus according to claim 1, wherein the controller changes at least one of a size, a length, a line thickness and transparency of the first object or changes at least one of a size, italicization and transparency of text displayed in the chat window, according to the direction information or the distance information.

3. The image display apparatus according to claim 1, wherein:
the communication unit receives updated direction information and distance information of the first external user, and
the controller displays a third object indicating the updated location information in the chat window.

4. The image display apparatus according to claim 1, wherein the communication unit receives the at least one of direction information and distance information of the first external user according to input for confirming the location information of the first external user.

5. The image display apparatus according to claim 4, wherein the communication unit stops reception of the at least one of direction information and distance information of the first external user according to input for ending confirmation of the location information of the first external user.

6. The image display apparatus according to claim 1, wherein the controller displays the map image instead of the chatting window on the display and a fourth object indicating locations of the first external user on the map image, when the first object is selected.

7. The image display apparatus according to claim 1, wherein the controller changes a display location of the first object displayed in the chat window according to the location information of the first external user.

8. The image display apparatus according to claim 1, wherein when reference location change input for the at least one of direction information and distance information is received or when an area-related word is displayed in the chat window, the controller changes the at least one of direction information and distance information of the first external user and displays the first object indicating the location information including at least one of the changed direction information and distance information.

9. A method for operating an image display apparatus, the method comprising:
displaying a chat window on a display, wherein the chat window includes input conversation content and an image indicating at least one external user;
when a specific word related the meeting place is displayed in the chatting window, generating and displaying a first object indicating location information including direction information and distance information between the image display apparatus and at least one external user without displaying a map image in the chat window;
based on the location information, generating, via a controller, an expected arrival time information of a first external user for a specific area; and
displaying a second object indicating the expected arrival time information without displaying the map image in the chat window,
wherein the first object includes an arrow object indicating direction information of the first external user, and a thickness object indicating distance information between the user of the image display apparatus and the first external user or distance information between a meeting place and the first external user,
wherein thickness of the thickness object increases as the distance information between the user of the image display apparatus and the first external user or the distance information between the meeting place and the first external user decreases, and
wherein the arrow object and the thickness object of the first object encircles a first image indicating the first external user, and the second object indicating the expected arrival time information is displayed below the first object.

10. The method according to claim 9, further comprising:
changing at least one of a size, a length, a line thickness and transparency of the first object or at least one of a size, italicization and transparency of text displayed in the chat window, according to the direction information or the distance information.

11. The method according to claim 9, further comprising:
updating the location information; and
displaying a third object indicating the updated location information in the chat window.

12. The method according to claim 9, further comprising:
receiving the direction information and distance information of the first external user according to input for confirming the location information of the first external user.

13. The method according to claim 12, wherein the receiving the direction information and distance information of the first external user is stopped according to an input for ending confirmation of the location information of the first external user.

14. The method according to claim 9, further comprising:
displaying the map image instead of the chatting window and a fourth object indicating locations of the first external user on the map image, when the first object is selected.

15. The method according to claim 9, wherein a display location of the first object displayed in the chat window is changed according to the location information of the first external user.

16. The method according to claim 9, further comprising:
when reference location change input for the at least one of direction information and distance information is received or when an area-related word is displayed in the chat window, changing the direction information and distance information of the first external user; and
displaying the first object indicating the location information including at least one of the changed direction information and distance information.

* * * * *